(12) United States Patent
Köhler et al.

(10) Patent No.: US 8,276,260 B2
(45) Date of Patent: Oct. 2, 2012

(54) SPRING STRUT POSITIONING DEVICE

(75) Inventors: Gerhard Köhler, Bischofsheim (DE); Olaf Recha, Niedernhausen (DE)

(73) Assignee: GM Global Technology Operations LLC, Detroit, MI (US)

( * ) Notice: Subject to any disclaimer, the term of this patent is extended or adjusted under 35 U.S.C. 154(b) by 525 days.

(21) Appl. No.: 12/375,365

(22) PCT Filed: Jul. 16, 2007

(86) PCT No.: PCT/EP2007/006300
§ 371 (c)(1),
(2), (4) Date: Jan. 25, 2010

(87) PCT Pub. No.: WO2008/012004
PCT Pub. Date: Jan. 31, 2008

(65) Prior Publication Data
US 2010/0126006 A1 May 27, 2010

(30) Foreign Application Priority Data
Jul. 28, 2006 (DE) .......................... 10 2006 035 025

(51) Int. Cl.
*B23P 21/00* (2006.01)
*B23P 19/00* (2006.01)

(52) U.S. Cl. ................ 29/700; 29/709; 29/787; 29/795; 29/242; 29/267; 29/271; 29/284

(58) Field of Classification Search ................... 29/700, 29/709, 787, 795, 267, 268, 271, 283, 284
See application file for complete search history.

(56) References Cited

U.S. PATENT DOCUMENTS

| | | | |
|---|---|---|---|
| 4,604,797 A | 8/1986 | Kitamura et al. | |
| 4,703,547 A | 11/1987 | Togawa | |
| 5,027,502 A | 7/1991 | Sakamoto et al. | |
| 7,685,699 B2 * | 3/2010 | Baulier et al. | 29/700 |
| 7,836,584 B2 * | 11/2010 | Lim | 29/787 |
| 2009/0158579 A1 | 6/2009 | Climent et al. | |

FOREIGN PATENT DOCUMENTS

DE 4121938 A1 1/1993

(Continued)

OTHER PUBLICATIONS

ISA European Patent Office, International Search Report for Application No. PCT/EP2007/006300, dated Oct. 23, 2007.

(Continued)

*Primary Examiner* — Jermie Cozart
(74) *Attorney, Agent, or Firm* — Ingrassia Fisher & Lorenz, P.C.

(57) ABSTRACT

A positioning device is provided for positioning of a spring leg and a shock damper motor axis when a connection to a body-shaped pieces of a suspension promoter suspended coach industry unit with a mounting stored chassis unit of the vehicle, with the positioning device includes an attachment element Fixture for fixing the direction positioning to mount one of the fixture resistance element jointed affiliated gripping central carrier with a gripper attached to appropriation reach of the spring leg and shock damper, with the gripping means by moving the grief-structural funds his joints in a rest medium defined rest positions to warden can be brought, namely a working position in which the grief by the central taken one spring leg or shock absorbers positioned, and the suspension strut or shock absorbers are not positioned normally.

3 Claims, 5 Drawing Sheets

FOREIGN PATENT DOCUMENTS

| | | | |
|---|---|---|---|
| DE | 4313407 | A1 | 10/1994 |
| DE | 19523294 | A1 | 1/1997 |
| DE | 102005048278 | A1 | 4/2007 |
| EP | 0629469 | A1 | 12/1994 |
| EP | 0751061 | A1 | 1/1997 |
| JP | 3007090 | U | 1/1991 |
| JP | 6183378 | A | 7/1994 |

OTHER PUBLICATIONS

German Patent Office, German Search Report for Application No. 102006035025.1, dated Aug. 2, 2009.

* cited by examiner

SPRING STRUT POSITIONING DEVICE

CROSS-REFERENCE TO RELATED APPLICATIONS

This application is a U.S. National-Stage entry under 35 U.S.C. §371 based on International Application No. PCT/EP2007/006300, filed Jul. 16, 2007, which was published under PCT Article 21(2) and which claims priority to German Application No. 10 2006 035 025.1, filed Jul. 28, 2006, which are all hereby incorporated in their entirety by reference.

TECHNICAL FIELD

The present invention relates to the field of vehicle construction and relates to a positioning device for a spring strut or a shock absorber of the vehicle axle of a motor vehicle.

BACKGROUND

In the industrial mass production of motor vehicles, vehicle components are usually assembled in a flow process along assembly lines. At the same time, endeavors are increasingly being made to connect not only individual parts but vehicle components, which have already been preassembled into modules or aggregates. An example of such a connection of preassembled modules in vehicle construction is the so-called "marriage" in which a body module is connected to a chassis module along an assembly section of an assembly line.

For connection of the body module to the chassis module during the marriage in a conventional assembly line, the preassembled body module is supplied to the assembly section provided for the marriage by means of a hanging conveyor, and a body hanger suspended on the hanging conveyor serves for suspension of the body module. In this case, it is possible that the hanging conveyor lowers the body unit from a higher level to a lower level at the beginning of the assembly section.

Over the length of the assembly section provided for the marriage, assembly stands are guided at floor level for mounting the already preassembled chassis modules, these being conveyed below the hanging conveyor at the same speed and in the same direction as the body hanger. In this case, the assembly stands are guided onto a return loop at the end of the assembly section, through which these are conveyed back to the beginning of the assembly section alongside the assembly section. Mounting plates are usually mounted "floatingly" by means of roller bearings on the assembly stands. Due to the floating mounting of the mounting plates, these can be positioned in the longitudinal and transverse direction, relative to the flow direction of the assembly section. In the area of the return loop the preassembled chassis module is deposited in a defined mounting position on the mounting plates.

The chassis module deposited on the mounting plates usually comprises, in addition to frame parts and subframe, an engine-transmission module with radiator, a front and rear axle, in each case with spring struts or shock absorbers, and an exhaust system. The assembly stands or the mounting plates for mounting the chassis module are usually adjustable in height so that the chassis module can hereby be brought into a suitable height for the marriage relative to the body module.

The connection of chassis and body modules of motor vehicles in the flow process is common practice in industrial series production and is sufficiently known as such to those skilled in the art.

In order to achieve a suitable alignment of the chassis module in relation to the body module for the connection, hydraulically, pneumatically, or electrically operated alignment elements are provided, for example, entrainer pins fastened to the mounting plates, which may engage in relevant recesses of the body module in order to hereby bring the chassis module into a defined position in relation to the body module.

Although the chassis module may be aligned by the alignment elements in its relative position to the body module, it is not hereby achieved that individual components of the chassis module such as the spring struts or shock absorbers of front and rear axle, may adopt a desired mounting position so that these can be driven in each case into the relevant arch of the body unit. In addition, it must be ensured that no other vehicle components are damaged during driving into the body module.

This problem has been solved hitherto by using several trained workers who ensure by manual alignment that the spring struts or shock absorbers adopt a specified mounting position or insertion position during the marriage, which however, requires a relatively high deployment of staff, takes working time, and in this respect increases the staff costs in an undesirable manner.

In fully automated assembly stations, it is furthermore known to use automatically controlled alignment arms for the alignment of spring struts or shock absorbers, which arms are driven externally toward the chassis module in order to align the spring struts or shock absorbers. Although the deployment of workers for the manual alignment of the spring struts or shock absorbers may be avoided by such automatically controlled alignment arms, these require comparatively high investment costs. In addition, separate installation space must be made available since these must be driven from outside onto the chassis module mounted on the assembly stand. In the event of a functional failure or for necessary maintenance work, the complete assembly section must be stopped, with the result that the production costs are increased in an undesirable manner.

Accordingly, it is at least one object of the present invention to provide an inexpensive positioning device for spring struts or shock absorbers of the vehicle axle of a motor vehicle, which allows secure alignment of a spring strut or shock absorber during the marriage without additional mounting space needing to be made available outside the assembly stand. In addition, other objects, desirable features, and characteristics will become apparent from the subsequent summary or detailed description, and the appended claims, taken in conjunction with the accompanying drawings and this background.

SUMMARY

The at least one object, other objects, desirable features, and characteristics, are achieved according to the proposal of the invention by a positioning device for spring struts or shock absorbers of the vehicle axle of a motor.

According to the invention, a positioning device for positioning a spring strut or shock absorber of a motor vehicle is disclosed, which serves to position the spring strut or the shock absorber in a suitable mounting position during the marriage in the flow process, i.e., during the connection of a body module which is suspended on a body hanger of a hanging conveyor to a chassis module, which is mounted on an assembly device. The mounting device may be constructed in a conventional manner from an assembly stand with mounting plates mounted floatingly thereon. The positioning device is advantageously fastened to a mounting plate.

The positioning device according to the invention comprises a device fastening element, for example, in the form of a fastening arm, for fastening the positioning device to the assembly device, in particular to a mounting plate, as well as a gripping means support element which is connected to the device fastening element in an articulated manner, for example, in the form of a gripping means support arm, and has a gripping means attached thereto for gripping the spring strut or shock absorber. In this case, by moving the gripping means support element relative to the device fastening element by means of the articulated connection between these two, the gripping means can be brought into various latching positions. The latching positions are defined and fixable by a latching means provided for this purpose. A first latching position of the positioning device is a working position in which the spring strut or shock absorber gripped by the gripping means is positioned in a (selectable) suitable installation position while a second latching position is a rest position of the positioning device in which the spring strut or shock absorber is not positioned. In the rest position, the positioning device does not disturb the further connection of chassis module and body module after these have been married and stands in readiness for positioning a further spring strut or shock absorber of another chassis module deposited on the mounting device at a later time.

With the aid of the positioning device according to the invention, which may be fastened to the mounting device, it is therefore advantageously possible for the first time to lock the gripping means in a suitable working position or rest position for positioning the spring strut or shock absorber merely by pivoting the gripping means support element about its articulated connection. Before executing the marriage, for accurate positioning of spring struts or shock absorbers it is merely necessary for these to be gripped by the gripping means and the positioning devices pivoted into their respective positioning positions, which is effected by manual actuation of the positioning devices. After driving the spring struts or shock absorbers into the body unit, it is sufficient if the gripping means is released from the spring struts or shock absorbers and brought into their respective rest positions, which again is effected by manual actuation. Unlike the conventional manual alignment, the spring struts or shock absorbers of the vehicle axles of a chassis module may be positioned for the marriage by, for example, only a single worker so that advantageously fewer staff than hitherto need to be used for this purpose.

Furthermore, the positioning device according to the invention, which may be mounting on the mounting device, requires relatively little installation space and is cheap to manufacture and maintain because of its comparatively simple technical structure.

In an advantageous embodiment of the positioning device according to the invention, the gripping means has cooperating prong-like gripping jaws, which are resiliently pre-tensioned by a resilient spring means, for gripping the spring strut or shock absorber. In order to grip a spring strut or a shock absorber, it is sufficient if the gripping jaws are pressed apart from one another, for example, by manual actuation of a worker in order to release an opening formed by the gripping jaws for receiving a spring strut or shock absorber between the two gripping jaws.

In a further advantageous embodiment of the positioning device according to the invention, a detection device is provided for detecting a latching position of the gripping means. In connection with a control and monitoring device of the mounting device, the detection device may serve as a safety device, for example, in the form that any lowering of the assembly stand or the mounting plates after the marriage has been made, may only take place when the positioning devices are located in their rest position.

The invention further extends to an arrangement for the connection of a body module suspended on a body hanger of a hanging conveyer to a chassis module of motor vehicle mounted on a mounting device in the flow process, which comprises a positioning device as described above for positioning a spring strut or shock absorber of a motor vehicle axle. The device fastening element for fastening the positioning device is advantageously attached to the assembly device.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any theory presented in the preceding background and summary or the following detailed description.

Figure 1:
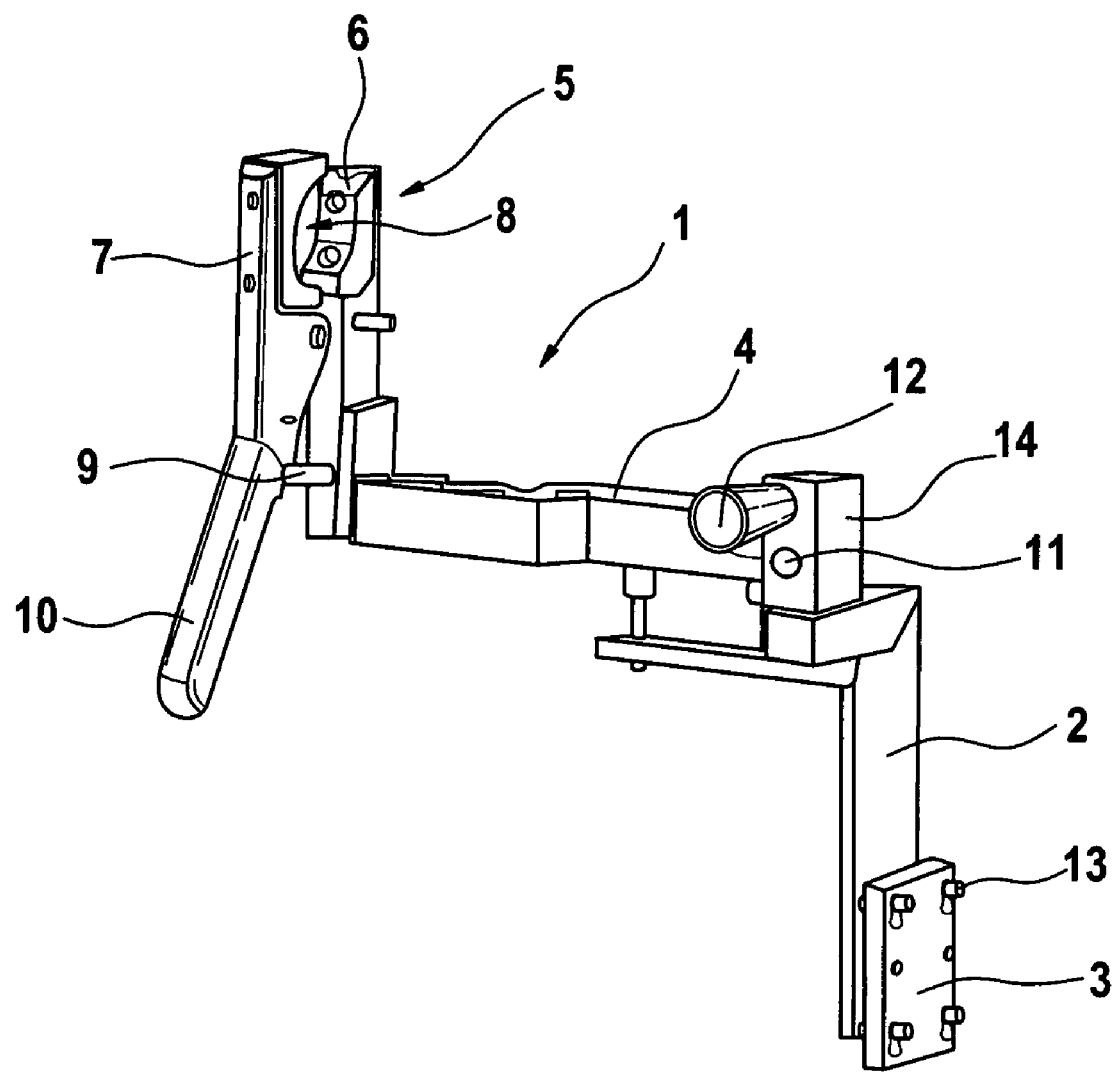
FIG. 1 shows a perspective view of an embodiment of the positioning device according to the invention.

FIG. 1 shows an exemplary embodiment of the positioning device according to the invention for positioning a spring strut or shock absorber of the vehicle axle of a motor vehicle. The positioning device according to the invention which is designated overall with the reference numeral 1, comprises a fastening arm 2 connected at one end to a flange plate 3, and the positioning device 1 is fastened to a mounting plate of an assembly stand by means of the flange plate 3. The flange plate 3 can be fastened to a mounting plate, for example, by means of fastening screws 13. The fastening arm 2 is connected in an articulated manner at its other end by means of a pivot joint 11 to one end of an angularly shaped gripping means arm 4. The gripping means arm 4 can be pivoted relative to the fastening arm 2 by the means the pivot joint 11. Attached at the other end of the gripping means arm 4 is a gripping means for gripping a spring strut or shock absorber, which is designated overall with the reference numeral 5. The gripping means 5 comprises two gripping jaws 6, 7, which jointly delimit in a prong-like manner a gripping opening 8 for receiving a spring strut or shock absorber. The two gripping jaws 6, 7 are pivotable with respect to one another, which is not shown in detail in FIG. 1 and are resiliently pre-tensioned by a resiliently compressible compression spring 9. By compressing the compression spring 9, the gripping opening 8 may be released and a spring strut or shock absorber may be received into the gripping opening 8 or removed from said opening. For manual actuation of a gripping means 5 by an operator, a handle 10 is molded on one of the two gripping jaws.

The gripping means arm 4 may be locked in a working position for positioning a spring strut or shock absorber in a defined installation position and in a rest position by means of a latching pin 12 which engages in a latching opening. A safety valve 14 which detects the latching positions of the positioning devices, which may be operatively coupled to a control and monitoring device of an assembly stand whose working position, for example, may be adjusted pneumatically or hydraulically, serves to control the assembly stand in such a manner that this may only be lowered after the marriage has been made, when the positioning device has been brought into its rest position so that a collision of the positioning device with vehicle components can be avoided.

Figure 2:
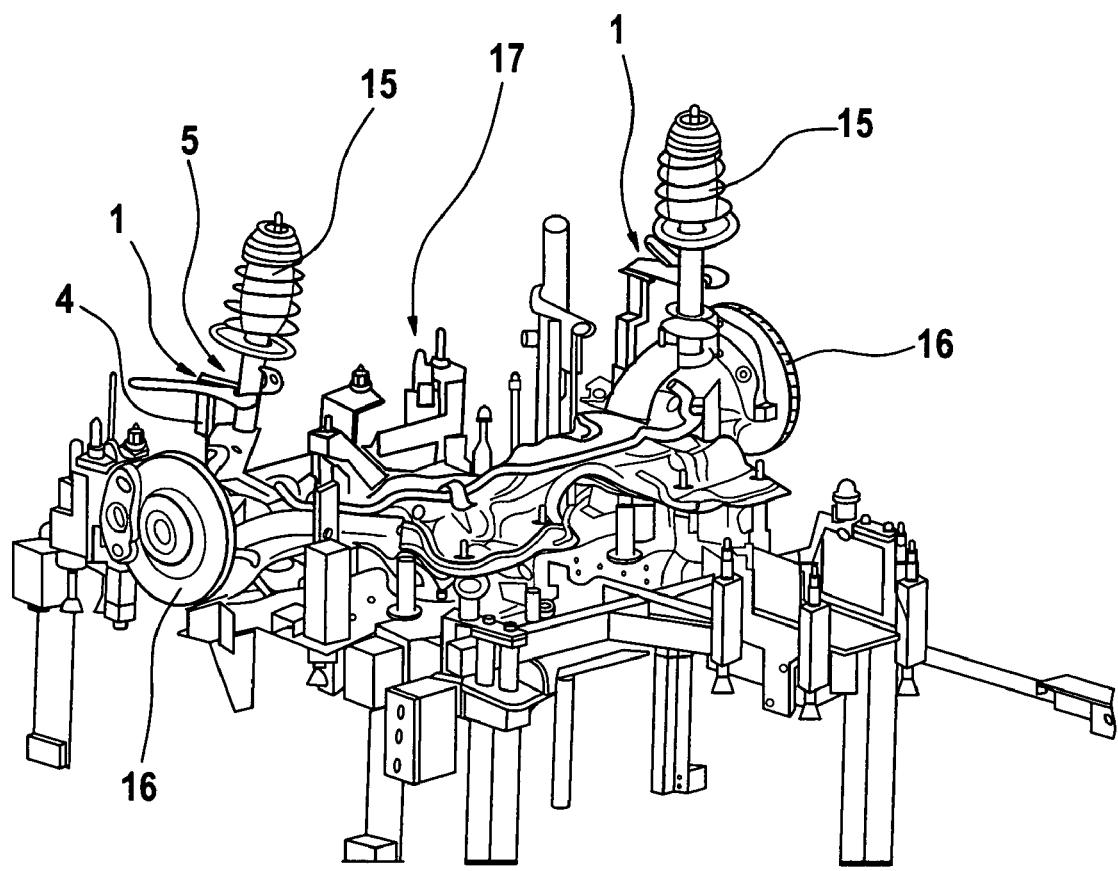
FIG. 2 shows a perspective view of positioning devices from FIG. 1 in a fastened position on a mounting plate of an assembly stand.
Figure 3:
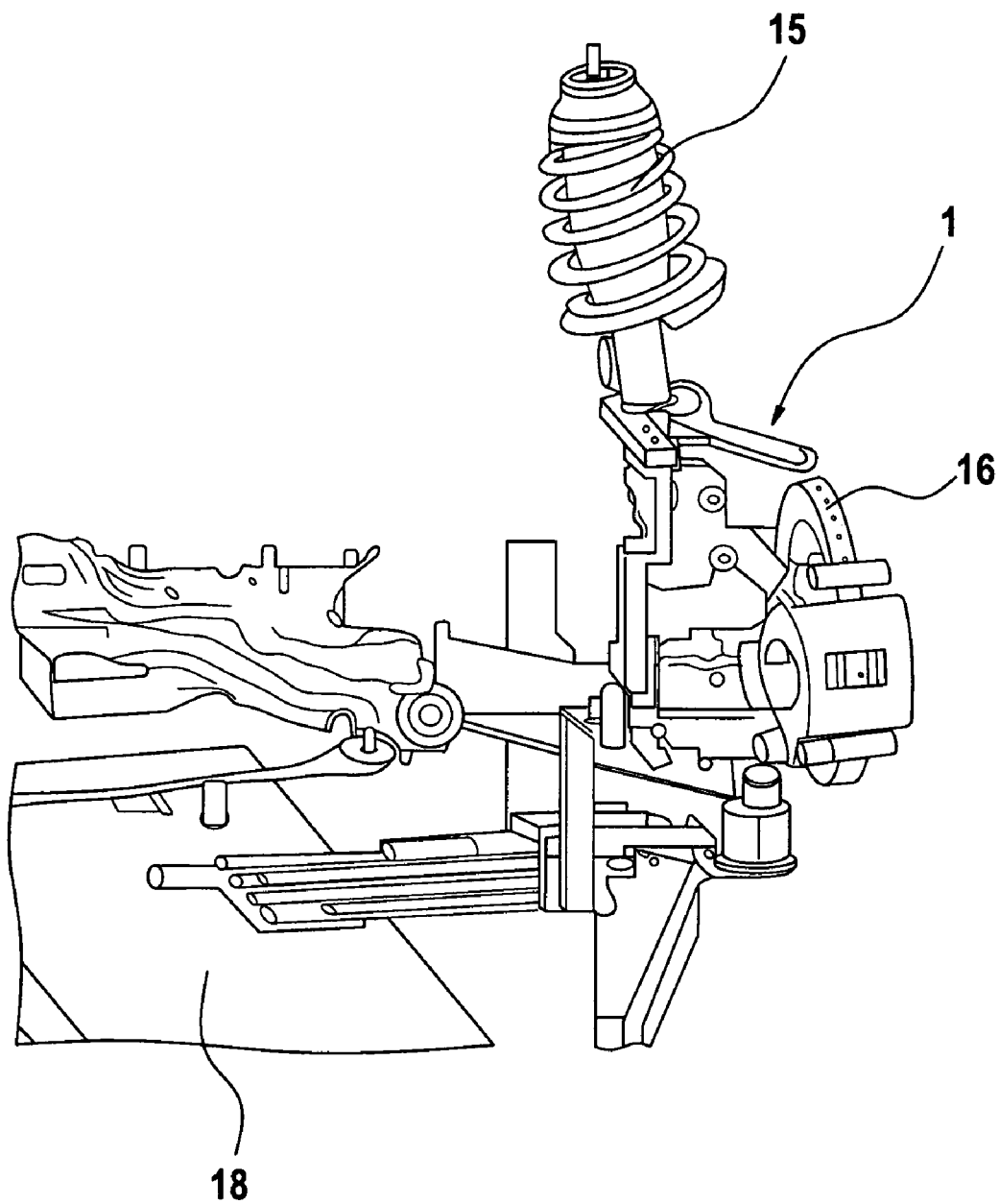
FIG. 3 shows a further perspective view of a positioning device from FIG. 2.

Reference is now made to FIG. 2 and FIG. 3, which show perspective views of the positioning device from FIG. 1 in the fastened position on a mounting plate of an assembly stand.

Accordingly, a chassis module of a motor vehicle is placed on a mounting plate 18, this being shown merely in cutaway view in FIG. 2 and FIG. 3 and being designated overall with the reference numeral 17. The chassis module 17 comprises hub carriers 16 of a front axle. Spring struts 15 are connected in an articulated manner to the hub carriers 16 by means of ball joints. Due to the articulated mounting of the spring struts 15 on the hub carriers 16, their position in space is not defined. Carriers 19 on which the positioning devices 1 according to the invention are flange-mounted, are fastened to the mounting plate 16. FIG. 2 and FIG. 3 each show a situation in which the positioning devices 1 are located in their working positions with gripped spring struts 15. By this means, the spring struts 15 are held in a suitable installation position for the following marriage. In order to bring the positioning devices 1 into the working position, it is merely necessary for a worker to manually actuate the gripping means 5 of a positioning device 1, grip a spring strut, and pivot the gripping means arm 4 into its working position and lock it there.

Figure 4:
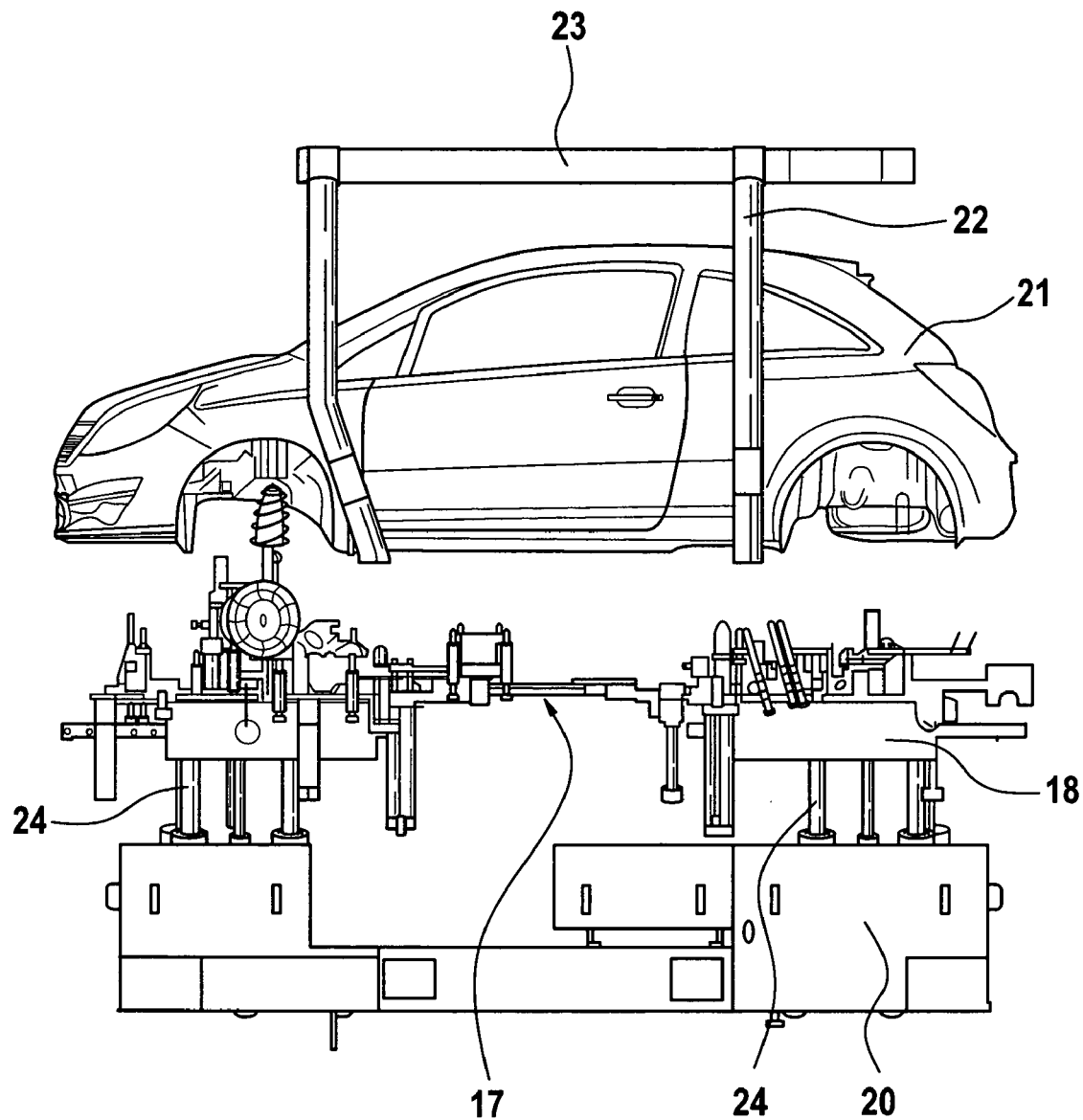
FIG. 4 shows a perspective view of a chassis module on an assembly stand and a suspended body module before marriage.
Figure 5:
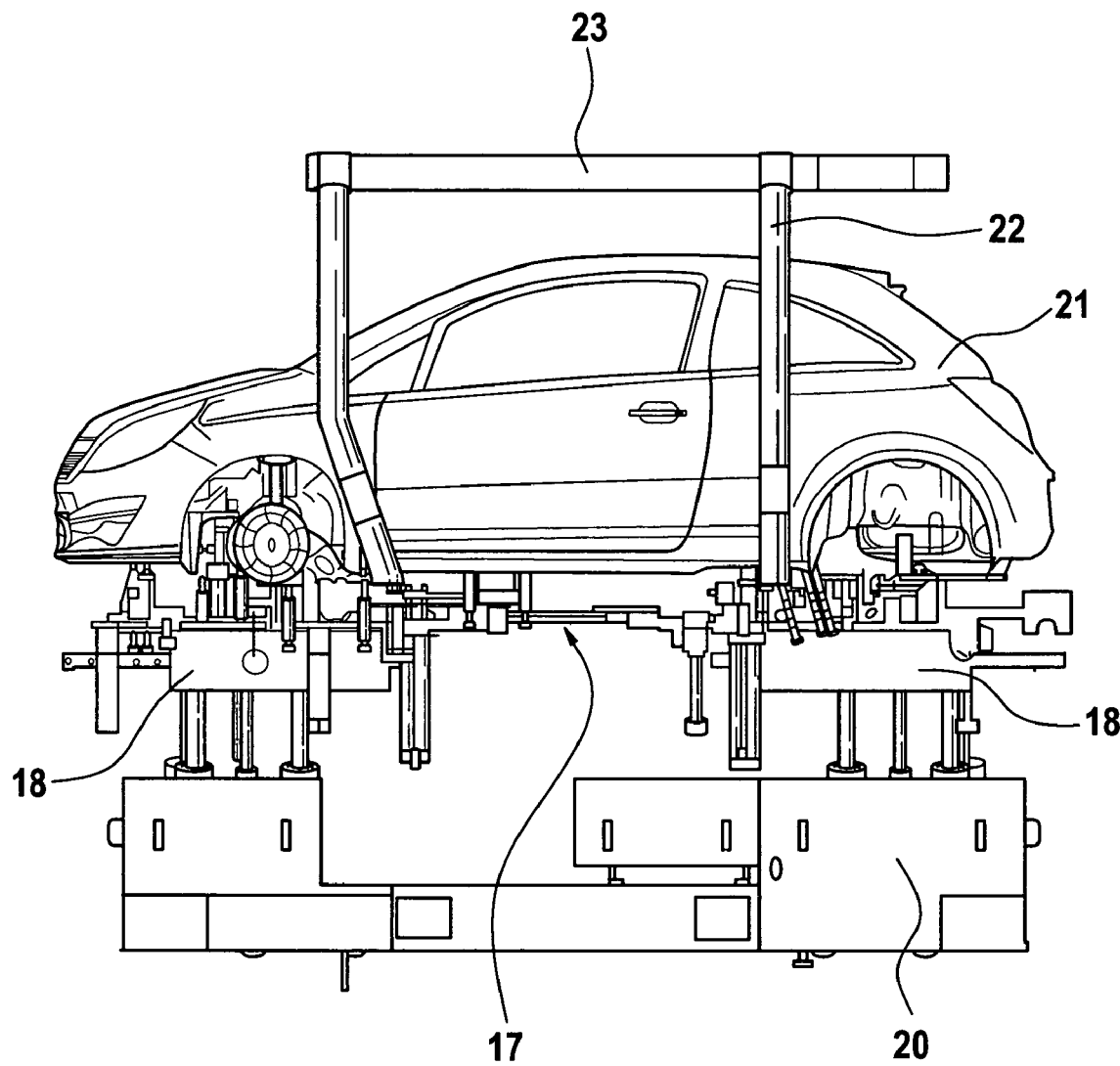
FIG. 5 shows a perspective view of the chassis module and the body module from FIG. 4 after marriage.

Reference is now made to FIG. 4 and FIG. 5, which show perspective views of a chassis module on an assembly stand and a suspended body module before and after marriage. Accordingly, a body module 21, which is conveyed along an assembly line by means of a body hanger 22 on a hanging conveyor 23 is to be connected to a chassis module 17, which for its part is mounted on mounting plates 18 of an assembly stand 20. The assembly stand 20 is conveyed in the flow process underneath the hanging conveyor at the same speed and in the same direction as the body hanger. As indicated, the chassis module 17 comprises frame parts, subframe, engine-transmission module with radiator, front and rear axle, as well as an exhaust system. The assembly stand 20 is adjustable in height by hydraulic or pneumatic piston-cylinder adjusting devices 24 in order to hereby bring the mounting plates 18 and thus the chassis module 17 placed thereon into a suitable height relative to the body module 21 for the marriage.

For the marriage, the spring struts 15 must be brought into a suitable installation position, which is accomplished by using the positioning devices according to the invention. In order to bring the spring struts 15 into a suitable installation position for the marriage, it is sufficient if the positioning devices with gripped spring strut are each brought into their working position. After the marriage has been made, the positioning devices must merely be released from the spring struts 15 and locked in their respective rest positions. The safety valves 14 of the positioning devices indicate to a control and monitoring device of the piston-cylinder adjusting devices 24 that the positioning devices are each located in their rest position so that the mounting plates 18 can be lowered.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment of the invention, it being understood that various changes may be made in the function and arrangement of elements described in an exemplary embodiment without departing from the scope as set forth in the appended claims and their legal equivalents.

The invention claimed is:

1. A positioning device for positioning at least one of a spring strut or a shock absorber of a motor vehicle during a connection of a body module, which is suspended on a body hanger of a hanging conveyor to a chassis module of the motor vehicle, which is mounted on an assembly device, the positioning device comprising:
   a device fastening element adapted to fasten the positioning device to the assembly device;
   a gripping support element which is connected to the device fastening element in an articulated manner, and
   a gripping element attached to the gripping support element, the gripping element configured to grip at least one of the spring strut or the shock absorber, the gripping element including a handle configured to enable manual actuation of the gripping element,
   wherein by moving the gripping support element about an articulated connection, the gripping element can be brought into a plurality of latching positions defined by a latch, the plurality of latching positions comprising a working position in which the at least one of the spring strut or the shock absorber gripped by the gripping element is positioned in a selectable installation position and a rest position in which the at least one of the spring strut or the shock absorber is not positioned in the selectable installation position.

2. The positioning device according to claim 1, in which the gripping element has cooperating gripping jaws which are resiliently pretensioned by a resilient spring, whereby the gripping element is adapted to grip the at least one of the spring strut or the shock absorber.

3. The positioning device according to claim 1, further comprising a detection device adapted to detect a latching position of the gripping element.

* * * * *